Dec. 19, 1950   A. G. FOX   2,534,862
RADIO RANGING SYSTEM WITH SELECTIVE AUTOMATIC
VOLUME CONTROL AND RANGE FOLLOWING
Filed June 23, 1942   2 Sheets-Sheet 1

INVENTOR
A. G. FOX
BY H. O. Wright
ATTORNEY

Dec. 19, 1950 A. G. FOX 2,534,862
RADIO RANGING SYSTEM WITH SELECTIVE AUTOMATIC
VOLUME CONTROL AND RANGE FOLLOWING
Filed June 23, 1942 2 Sheets-Sheet 2
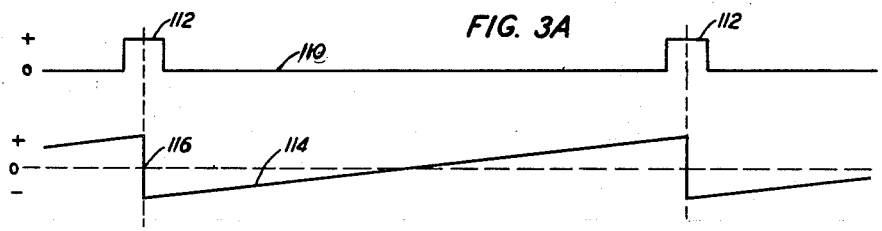
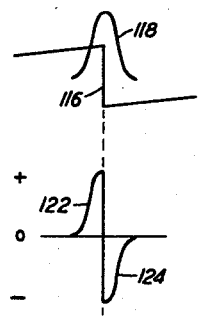
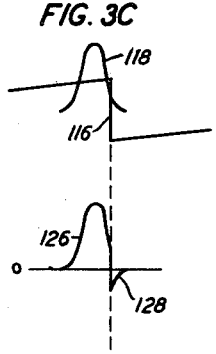
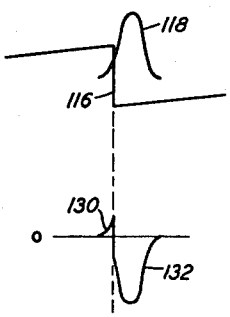
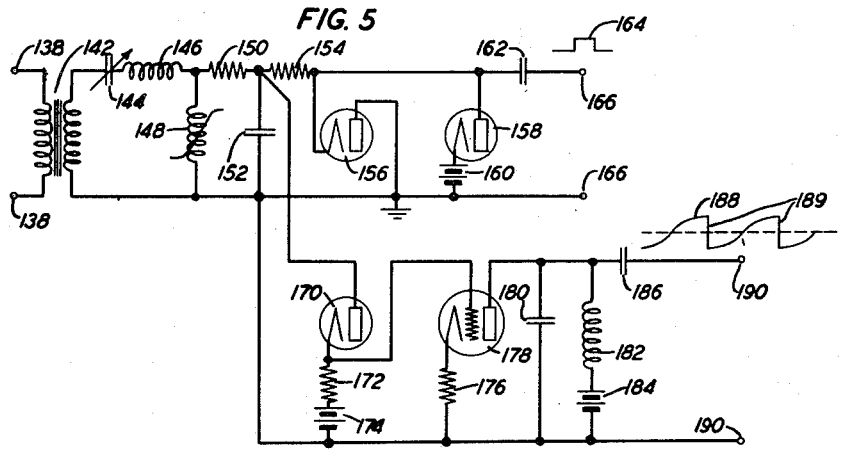
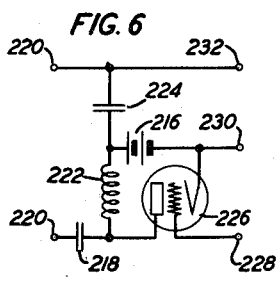
INVENTOR
A. G. FOX
BY *H. O. Wright*
ATTORNEY Patented Dec. 19, 1950

2,534,862

UNITED STATES PATENT OFFICE 2,534,862

RADIO RANGING SYSTEM WITH SELECTIVE AUTOMATIC VOLUME CONTROL AND RANGE FOLLOWING

Arthur Gardner Fox, Morristown, N. J., assignor to Bell Telephone Laboratories, Incorporated, New York, N. Y., a corporation of New York Application June 23, 1942, Serial No. 448,099

7 Claims. (Cl. 343—13)

This invention relates to improvements in pulse-reflection type object-locating systems and similar systems. More particularly, it relates to the automatic volume controlling of the receiver of a system in accordance with a particular selected signal, the system excluding unwanted signals and to manual and automatic following systems for observing and following a particular signal to the exclusion of other signals.

In a preferred form, the invention may be embodied in a system of the type in which short pulses are emitted at intervals, reflections thereof are received from objects upon which the emitted pulses impinge and the reflection time for particular reflections are determined to provide indications of the distances of the objects from which the respective reflected signals are received. When, as is preferred, the emitting or receiving antennas are highly directive, the orientation of the highly directive antennas provides an indication of the azimuth and elevation angles of the objects from which reflections are received. When, as is frequently the case, a number of objects lie in substantially the same direction but are at different distances and have different reflecting properties, the nearer or the more efficiently reflecting objects will return more powerful reflected pulses which may tend to obscure reflections from other objects the position and distance of which may be of primary interest.

Objects of this invention, therefore, are to permit the selection of any particular reflected signal, even though it may be substantially smaller in amplitude than other reflected signals received from nearby objects, to exclude the unwanted reflected signals, to provide suitable volume control for the selected signal and to provide a system which will automatically follow the selected reflected signal as the range or distance of the object from which it is received changes with respect to the observation station.

Other and further objects will become apparent during the course of the following description and in the appended claims.

The principles of the invention will be more readily understood in connection with the detailed description of illustrative embodiments shown in the accompanying drawings, in which:

Fig. 1 shows, in schematic block-diagram form, a pulse-reflection object-locating system embodying several principles of the invention and including apparatus arranged to enable a selection of particular reflected pulses to be made by manually controlled phase-shifting mechanism, apparatus to provide automatic volume control in accord with the selected pulses and apparatus to provide a precision timing or distance-indicating mark;

Figs. 3A, 3B, 3C and 3D illustrate the cooperative use of selector and synchronizing pulses upon which the signal-following mechanism of Fig. 2 is based;

Fig. 5 illustrates a particular form of the pulse-generating circuits suitable for use in systems of the invention of the type shown in Fig. 2; and Fig. 6 illustrates a particular form of phase-shifting circuit, the phase shift of which can be controlled electrically by varying the potential upon the control grid of an electronic device.

Figure 1:
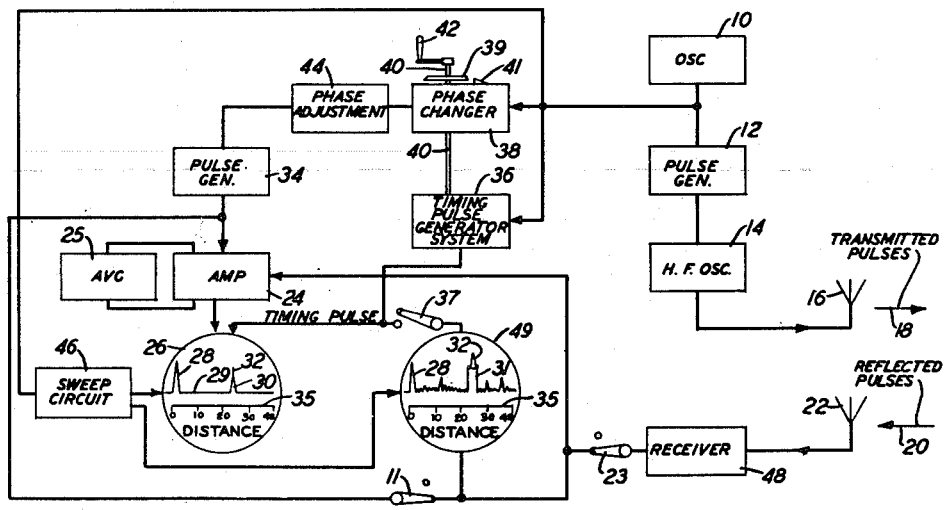

In more detail, in Fig. 1 an oscillator 10 provides a sine wave having a suitable periodicity which for the majority of pulse-reflection type systems can conveniently be between 1,000 to 4,000 cycles per second. This oscillator energizes a pulse generator 12 of any of the several types well known in the art, for example, see United States Patent 2,117,752, issued May 17, 1938 to L. R. Wrathall, which provides an energy pulse at a particular point of each cycle of the input wave provided to it. The pulse generator 12, in turn, energizes a high frequency oscillator or transmitter 14 and the latter energizes antenna 16 to emit pulses 18 from the antenna toward the area in which the presence of reflecting objects is to be detected.

Oscillator 10 also provides energy to phase changer 38, the phase shift of which is manually adjusted by turning handle 42 on shaft 40. Phase changer 38 and other phase changers employed in systems of this invention can preferably be of the type described in detail in United States Patent 2,004,613, issued June 11, 1935 to L. A. Meacham, except for features which are described in this specification in detail.

The energy passing through phase changer 38 is conducted through phase adjustment device 44, the function of which will be described in detail presently, to a pulse generator 34. Pulse generator 34 provides a selector pulse, i. e., a relatively broad flat-topped pulse, the phase relation of which with respect to the output of oscillator 10 is, of course, determined and controllable by phase changer 38 and phase adjuster 44. It may be of any of the well-known forms of square-topped pulse generators of the art providing a substantially squared pulse of definitely determined duration. As will presently appear, it is preferably several times as wide as the pulses emitted by antenna 16. By way of example, many pulse-reflection object-locating systems emit pulses in the order of 5 microseconds in duration and for such systems the pedestal or selector pulse of pulse generator 34 should preferably be a square pulse of approximately 15 microseconds in duration.

The primary function of the pedestal or selector pulse is to unblock during reception of a particular reflected pulse, the blanking amplifier 24 which can be biased so as to respond only to signals exceeding a particular amplitude, the bias being such that no received signal is of sufficient amplitude to overcome it unless accompanied by the selector pulse. Alternatively, the selector pulse may comprise the plate voltage for the input stage of amplifier 24 in which case amplifier 24 will pass no signals of any amplitude, in the absence of the selector pulse. Amplifier 24 is, in turn, provided with an automatic volume-controlling circuit 25 to control its amplification appropriately in accordance with the amplitude of the selected signal, i. e., the input signal which is coexistent with the selector pulse.

Reflections from remote objects of the pulses emitted by antenna 16 are received by antenna 22 detected and amplified in receiver 48 and conducted to blanking amplifier 24 which as above explained passes only those reflected signals which are coincident in time with selector pulses from pulse generator 34. These pulses only are amplified and pass to the vertical deflecting plates of cathode ray oscilloscope 26.

Figure 2:
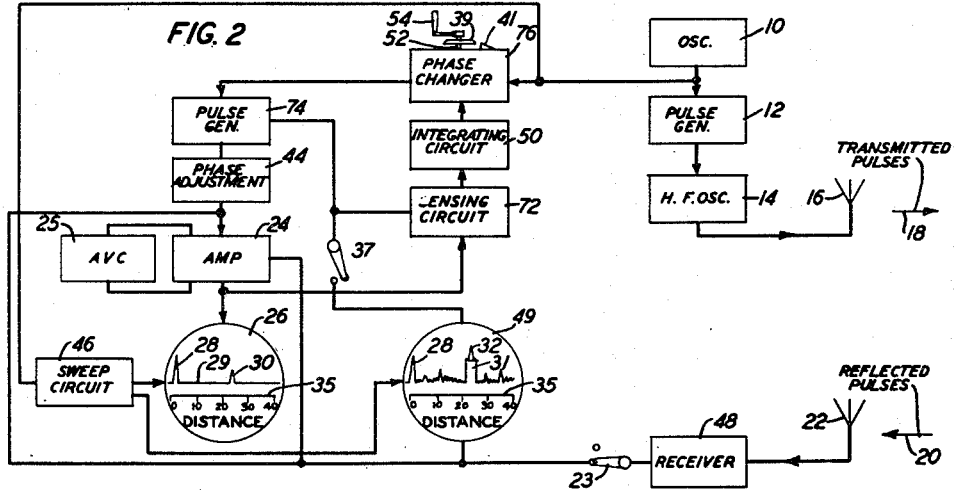
Fig. 2 shows, in block-schematic form, a system similar to that of Fig. 1 modified to provide automatic control of the phase-shifting mechanism to follow a selected reflected signal as its range with respect to the observing station changes.

A sweep circuit 46 provides for lateral displacement of the ray of the oscilloscope in synchronism with the emission of pulses from the transmitting antenna 16. Sweep circuit 46 connects to the horizontal deflecting plates of oscilloscope 26 and starts the ray sweeping across the target as a pulse is emitted so that the lateral position of a vertical deflection 30, caused by a received reflected pulse passed by blanking amplifier 24, is a measure of the reflection time or the distance to the particular object from which that pulse may be reflected. If desired, the initial transmitted pulse 28 may be made to appear at the left end or start of the sweep preferably by providing sufficient direct transmission (or coupling) between antennas 16 and 22 so that its amplitude will suffice to override the bias of blanking amplifier 24 or by other obvious arrangements well known to the art. A distance scale 35 is preferably associated with the oscilloscope target to facilitate distance measurement. In Figs. 1 and 2 the cathode ray oscilloscopes 26 and 49 are of the conventional type, having ray generating and controlling means and two pairs of deflecting plates, one pair producing horizontal deflection of the ray, the other pair producing vertical deflection of the ray. In the schematic showing of Figs. 1 and 2 the oscilloscopes are represented by circles and connections to the horizontal or vertical plates are represented by horizontal or vertical connections to the circles, respectively.

As an accurate timing or distance measurement aid, an accurately phased sharp short pulse 32 can be provided by the timing pulse-generating system 36 and superimposed upon the received reflected signal 30, and the adjustment required to effect this condition will then afford an extremely accurate reflection time or distance measurement. System 36 is preferably of the type described in the copending application of D. Pollack, Serial No. 409,600, filed September 5, 1941, entitled "Phase and Distance Measuring Systems," in which a harmonic of the fundamental or pulsing frequency is selected and caused to generate a series of sharp accurately placed pulses and a broader pulse derived from the fundamental is employed to select a particular one of the pulses generated from the harmonic. In such a system the selector pulse is controlled by a phase shifter substantially identical in function and purpose with phase changer 38 described above, the harmonic is controlled by a like phase shifter and the two phase shifters are connected by a gear train having a ratio such that the harmonic frequency is shifted by the harmonic ratio times the phase shift imparted to the fundamental.

In the present system the fundamental phase shifter of system 36 can be attached to the same shaft 40 as phase changer 38, and a dial 39 on shaft 40 can carry a scale whose position with respect to a pointer 41 on the housing of phase changer 38 will indicate directly and with a high degree of precision the reflection time or distance to a reflecting object the reflection from which has been brought into coincidence with the timing pulse provided by system 36.

To facilitate operation of the system of Fig. 1, a second cathode ray oscilloscope 49 can be employed upon which all reflected signals received by antenna 22 and detected and amplified in receiver 48 can be observed. The selector pulse from generator 34 and the precision timing pulse from system 36 can be superimposed by closing switches 11 and 37, respectively, upon the trace of oscilloscope 49 to facilitate the selection of a particular one of the reflected signals appearing on the oscilloscope. By opening switch 23 the receiver 48 is disconnected from oscilloscope 49 in which case the selector pulse of generator 34 and the precision timing pulse of system 36 can be displayed upon oscilloscope 49 and the selector pulse can be centered with respect to the precision timing pulse by adjusting phase adjustment 44. Thus, when switch 23 is again closed and control crank 42 is turned to align the timing pulse with a particular signal, the signal will be centered with respect to the selector pulse.

Control crank 42 can also be employed to keep the precision timing pulse on a particular reflected signal so that changes in the range of the object from which it is received can be accurately followed.

For accurately observing the azimuth and elevation of reflecting objects either transmitting antenna 16, or receiving antenna 22, or both, can be made sharply directive.

In Fig. 2 a system similar to that of Fig. 1 is illustrated in block-schematic diagram form, the system of Fig. 2 being modified to provide means for automatically following changes in the range or distance of an object from which the particular selected received reflected pulses are being observed.

The system of Fig. 2 includes, as for the system of Fig. 1, a standard oscillator 10, a pulse generator 12, a high frequency oscillator or transmitter 14, a sending antenna 16 emitting pulses 18 toward the area in which reflecting objects are to be observed, a receiving antenna 22 responsive to reflections 20 of the emitted pulses resulting from reflection of the latter from objects in the field of observation, a receiver 48 for detecting and amplifying the received reflected pulses, an oscilloscope 49 actuated by a sweep circuit 46 upon which all received reflected pulses are shown, an amplifier 24 with an automatic volume control circuit 25, an oscilloscope 26 also operated by sweep circuit 46, and a phase adjustment device 44.

The system of Fig. 2 also includes a phase changer 76, a pulse generator 74, a control device 50, and a sensing circuit 72 having specific unique characteristics to be described presently, which provide for automatic following in range as the range or distance of an object, the received reflected signal from which has been selected for observation, changes with respect to the observing station.

The fundamental principles involved may be more readily understood by consideration of the curves of Figs. 3A, 3B, 3C and 3D. In Fig. 3A, pulse 112 is a selector pulse such as was used in the system of Fig. 1 to effect the passage of a particular selected reflected pulse through the blanking amplifier 24 which will reject other reflected pulses as being of too small amplitude to overcome the bias on its input. In addition to selector pulse 112 the system of Fig. 2 also employs a so-called synchronizing pulse (or wave) 114, 116, which is of such shape and so timed that it passes rapidly from an appreciable positive value to a like appreciable negative value at the center of the selector pulse.

Figs. 3B, 3C and 3D then represent three operating conditions to which a range-following system must respond appropriately, and indicate appropriate corresponding responses respectively, for an auxiliary control or sensing circuit of such a system. In the upper half of Fig. 3B, 118 is the reflected pulse to be followed in range. The synchronizing pulse 116 is centered with respect to this pulse in this figure and no change in adjustment of the system is, therefore, required. The auxiliary control or sensing circuit can, therefore, appropriately produce a balanced or neutral indication such as that shown in the lower half of Fig. 3B, i. e., a positive portion 122 and a like negative portion 124 which can balance each other to produce a zero or "no change" indication. In the upper half of Fig. 3C, the observed pulse 118 is leading the synchronizing pulse 116, i. e., the range has decreased and the response of the system should be unbalanced. As indicated in the lower half of Fig. 3C, this response can appropriately consist of a large positive pulse 126 and a small negative pulse 128, the difference between pulses 126 and 128 being proportional to the degree to which pulse 118 is off center with respect to synchronizing pulse 116. Fig. 3D similarly represents the condition of the observed pulse 118 lagging the synchonizing pulse 116 and the response in the lower half of the figure can now appropriately comprise a small positive pulse 130 and a large negative pulse 132, indicating that the range of the observed pulse 118 is increasing.

In Fig. 2 pulse generator 74 supplies both the selector pulse (pulse 112 of Fig. 3A) for amplifier 24 and the synchronizing pulse (pulse 114 of Fig. 3A) for the sensing circuit 72. By opening the switch 23 in the output of receiver 48 and closing switch 37 to connect the synchronizing pulse to the vertical deflecting plates of oscilloscope 49, the alignment of the synchronizing pulse with the selector pulse may be observed. Phase adjustment device 44 can then be adjusted to center the synchronizing pulse with respect to the selector pulse.

Sensing circuit 72 can conveniently be a conventional balanced or "push-pull" type modulator, the synchronizing pulse operating as a bias to alternately bias the sides of the modulator to transmit such portion of the reflected pulse as may be located on the side of the cross-over of the synchronizing pulse, which results in transmission through the particular side of the modulator then functioning. With such an arrangement the direct current component of the balanced modulator output will be zero for the condition of balance illustrated in Fig. 3B, while for the conditions illustrated in Figs. 3C and 3D, a pulse of direct current, positive for the condition of 3C and negative for the condition of 3D will be obtained.

The direct current component provided by sensing circuit 72 can then, obviously, be employed to control a reversible direct current motor to adjust the phase of phase changer 76 so as to keep the selector and synchronizing pulses centered with respect to the reflected pulse whose range is to be followed and for such an arrangement device 50 will represent such a motor with preliminary direct current amplification incorporated therewith if desirable to provide adequate motive power.

Figure 4:
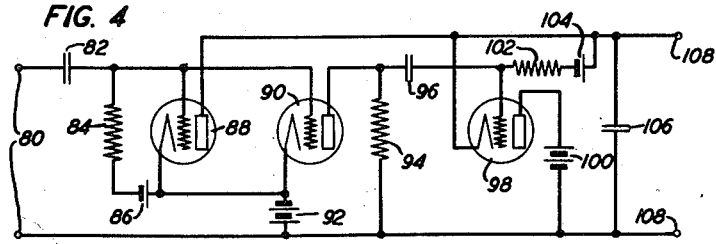
Fig. 4 illustrates a particular form of integrating circuit suitable for use in following mechanisms employed in systems of the invention.

It is preferable in some instances, however, to effect the automatic following in range by purely electrical means in which case device 50 can preferably be an integrating circuit such as is shown in detail in Fig. 4.

In Fig. 4, the integrating circuit comprises input terminals 80 connecting to a condenser 82, a resistance 84 and direct current bias potential sources 86 and 92 which provide coupling as shown in Fig. 4 to the control grid-cathode circuits of vacuum tubes 88 and 90. The anode of tube 88 is connected directly to the cathode of vacuum tube 98 and through a resistance 102 and bias potential source 104 to the control grid of this same tube. The anode of the tube 90 connects to the control grid of tube 98 through shunting resistance 94 and series capacity 96. The anode circuit of tube 98 includes a direct current potential source 100. Output terminals 108 of this integrating circuit have in shunt therewith a storage capacity 106. In the circuit of Fig. 4 vacuum tubes 88 and 98 are normally biased to be non-conductive unless their grids are given an additional positive bias, whereas tube 90 is normally conductive unless its grid is given additional negative bias. As plus or minus pulses are applied from the balanced modulator sensing circuit of device 72 to the input terminals 80, either tube 88 or tube 98 respectively passes pulses of current which serve to charge condenser 106 in one sense or the other. When there is no current from the modulator, the voltage across condenser 106 will remain substantially constant until the modulator signals for further change. Tube 90 serves simply to invert the voltage of a negative pulse applied to terminals 80 for application to the control grid circuit of tube 98. Numerous other integrating circuits of this type can be readily devised by those skilled in the art.

The pulse generator 74 of the system of Fig. 2, as indicated above, supplies both the selector pulse and the synchronizing pulse. An electrical schematic of a preferred form for this pulse generator is shown in Fig. 5. In Fig. 5 the output of the master oscillator 10 of Fig. 2 after passing through phase changer 76 is introduced into terminals 138 which connect to input transformer 142. Transformer 142, in turn, connects through the series resonant combination of capacity 144 and inductance 146 to the non-linear coil 148, which produces a sharp pulse of energy for each half cycle of the input wave. The uses of such non-linear impulse-generating coils are well known in the art, for example, see Patent 2,117,752, issued May 17, 1938 to L. R. Wrathall. The energy pulses generated are stored in condensor 152. Resistance 150 and condenser 152 provide the appropriate time constant for the desired pulse duration. Resistance 154 aids in producing shaping of the pulse by diodes 156 and 158. Diode 156 also provides for the discharge of the condenser 152 when charged by the negative pulses which are not employed in the present arrangement and diode 158 is biased by direct current potential source 160 to square off the top of the selector pulse, so that a pulse 164 as indicated above terminals 166 will be provided. Condenser 162 isolates the anode of diode 158 from direct current potentials in the circuits to which the output terminals 166 may be connected, particularly amplifier 24 of Fig. 2.

The pulses occurring across condenser 152 are also furnished to diode 170, in the cathode circuit of which are connected resistance 172 and direct current potential source 174. Positive pulses pass through diode 170 and drive the grid of triode 178 positive. Triode 178 and its associated circuit including resistance 176, capacities 180 and 186, inductance 182 and direct current potential source 184 comprise a shaping circuit which provides the synchronizing pulse or wave 188 indicated above the output terminals 190. When the cross-over portions 189 of wave 188 are relatively far apart the intermediate portions of wave 188 become substantially linear as illustrated by wave 114 of Fig. 3A. Pulse generators of the above-described types are well known in the art and may be of numerous other forms than those illustrated in Fig. 5.

Phase changer 76 of Fig. 2 should be similar to phase changer 38 of Fig. 1 in that a manual control operable by a manually controlled adjustment, crank 54 and shaft 52, are provided to set the selector pulse under the particular reflected signal it is desired to observe. A scaled dial 39 and pointer 41 may be provided as in Fig. 1. Phase changer 76 is, however, subject also to electrical control as described above in detail to follow automatically the particular reflected pulse which has been selected for observation.

One preferable form of electrically controlled phase-shifting circuit which can conveniently be employed in phase shifter 76 of Fig. 2 is shown in detail in Fig. 6 in which terminals 220 provide an input circuit and terminals 230 and 232 provide an output circuit. Across the input circuit terminals there is placed a series circuit comprising an inductance 222 and a capacity 224. The inductance 222 is, in turn, shunted by the cathode-anode circuit of a triode 226. Voltage is supplied to the anode of triode 226 by the direct current potential source 216, and is prevented from reaching lower terminal 220 by condenser 218. Terminal 228 connects the control grid of triode 226 to the integrating circuit 50 of Fig. 2 whereby the cathode-anode circuit impedance of triode 226 is changed in accordance with the integrated signal of the sensing circuit 72 thus altering the phase of the phase changer to keep the selector and synchronizing pulses automatically centered on the selected signal. Numerous other electrically controlled phase-shifting circuits are well known in the art.

Sweep circuit 46 for both Figs. 1 and 2 is preferably synchronized with the output of oscillator 10 so as to start the sweep of each trace simultaneously with the emission of a pulse from antenna 16. In some cases it may be desirable to start the sweep a short interval of time before or after the emission of the pulse, particularly where a portion of the range is to be expanded for a more detailed examination of reflections from a selected part of the total range. For expanded ranges, where desired, a higher velocity of sweep is of course employed. Numerous arrangements of this type are well known in the art.

Numerous systems of the type illustrated in the accompanying drawings can be devised by those skilled in the art without departing from the spirit and scope of the invention as defined in the following claims.

What is claimed is:

1. In an object-detection system of the pulse reflection type in which energy pulses are directively transmitted to impinge upon objects within a predetermined region, reflections of said pulses are received from said objects and the distance to any particular object is determined by noting the time between the emission of a pulse and the receipt of a reflection thereof from the said particular object, means for selecting the reflected pulses from a particular object and excluding reflections from other objects which comprises an amplifier in the reflected-pulse receiving system, said amplifier being normally blocked, means for generating a selector pulse, means for adjusting the phase of the selector pulse to occur simultaneously with the reflected pulses from the particular object only, means for introducing said selector pulse into said amplifier to unblock the same, and means for generating a synchronizing pulse wave, said synchronizing pulse wave being synchronized with the said selector pulse and rapidly changing from an appreciable positive to an appreciable negative value at substantially the center of said selector pulse, a sensing circuit, means for introducing the selected reflected pulse and the synchronizing pulse wave into said sensing circuit, said sensing circuit providing a balanced output when the selected pulse and synchronizing pulse wave are mutually centered, an output of one polarity when the selected pulse center occurs before the center of the synchronizing pulse wave and an output of the opposite polarity for the reverse condition, whereby an automatic electrical control is obtained which can be employed to adjust the phase of the selector pulse and synchronizing pulse wave to follow phase changes in the selected reflected pulse.

2. In a radio object-location system, means for generating and means for directively emitting pulses to strike objects within a particular region, some of said objects being in motion, means for receiving reflections of said pulses from objects within said region, means for selecting a particular reflected pulse, means for automatically controlling the volume of the amplification of the receiving system appropriately for the selected reflected pulse, and means for automatically following in phase or range the selected reflected pulse, said last stated means including means for generating a synchronizing pulse wave rapidly changing from an appreciable positive to an appreciable negative value at a "center" point in said wave, a sensing circuit, means for introducing the selected reflected pulse and the synchronizing pulse wave into said sensing circuit, said sensing circuit providing a balanced output when the selected pulse and synchronizing pulse wave are mutually centered, an output of one polarity when the selected pulse is displaced in one direction and an output of the opposite polarity when the selected pulse is displaced in the other direction with respect to said synchronizing pulse wave "center."

3. In a recurrent pulse-reflection type, radio, distance-measuring system, means for producing a recurrent synchronizing pulse wave which has the same periodicity as the distance measuring system and changes rapidly from a substantial value of one polarity to a like value of the opposite polarity in passing through its center point, means for centering said synchronizing pulse wave with respect to a particular recurrent received reflected pulse, means for comparing the amplitude of the portion of the reflected pulse falling on one side of the center point of the synchronizing pulse wave with the portion on the other side of said center point and means responsive to said amplitude comparison means for adjusting the timing of said synchronizing pulse wave to keep it centered with respect to the selected received reflected pulse.

4. In a recurrent pulse-reflection type radio ranging system, means for synchronizing the cross-over point of a locally derived recurrent pulse wave which changes rapidly at a cross-over point from an appreciable positive to an appreciable negative value with a recurrent received reflected pulse, comprising means for combining the received pulse and locally generated pulse wave to produce for each received pulse two electrical quantities, one representing the combination of the pulse and the wave on one side of the cross-over point of the locally generated pulse wave and the second representing the combination of the pulse and the wave on the other side of said cross-over point, and means responsive to differences in said two electrical quantities to maintain the locally generated pulse wave cross-over centered with respect to the received reflected pulse.

5. In a recurrent pulse-reflection type object locating system, the combination comprising means for producing a selector pulse in determined adjustable time relation to the transmitted pulse and of amplitude exceeding that of the received reflected pulses, a transmission path opaque to signals of amplitude less than that of said selector pulse, means for supplying received reflected pulses and said selector pulse to said transmission path, means for producing in synchronism with said selector pulse a control pulse having a definite time-amplitude discontinuity, means responsive to said control pulse and a reflected pulse selected by adjustment of said selector pulse to produce two electrical quantities, one determined by the portion of said selected reflected pulse occurring on one side of the discontinuity of said control pulse, the other determined by the portion on the other side of the discontinuity and means responsive to the said two electrical quantities to maintain said discontinuity in synchronism with the center of said reflected pulse.

6. In an energy pulse reflection object detection and ranging system, means for recurrently transmitting an exploratory energy pulse, means for receiving reflections of said pulse, a first display means for simultaneously displaying visually all received reflections on a time or distance scale, means for generating a recurrent selector pulse, means including said first display means for synchronizing said selector pulse with a particular one only of said received reflections and visually indicating which of said received reflections is synchronized with said selector pulse, and a second display means controlled by said selector pulse for displaying visually the selected reflection only on a time or distance scale.

7. In combination with the arrangement of claim 6, means for automatically controlling the amplification of said selected reflection, by said system in accordance with the amplitude of said selected reflection.

A. GARDNER FOX.

REFERENCES CITED

The following references are of record in the file of this patent:

UNITED STATES PATENTS

| Number | Name | Date |
| --- | --- | --- |
| 1,924,174 | Wolf | Aug. 29, 1933 |
| 2,055,883 | Terry | Sept. 29, 1936 |
| 2,143,035 | Smith | Jan. 10, 1939 |
| 2,208,422 | Hugon | July 16, 1940 |
| 2,288,434 | Bradley | June 30, 1942 |
| 2,300,189 | Wolff | Oct. 27, 1942 |
| 2,403,975 | Graham | July 16, 1946 |
| 2,407,898 | Norgaard | Sept. 17, 1946 |
| 2,416,088 | Deerhake | Feb. 18, 1947 |
| 2,433,838 | Elie et al. | Jan. 6, 1948 |
| 2,455,673 | Hansell | Dec. 7, 1948 |

FOREIGN PATENTS

| Number | Country | Date |
| --- | --- | --- |
| 853,994 | France | Apr. 2, 1940 |